Figure 1:
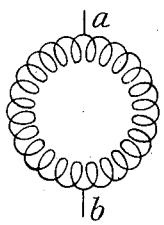

R. D. MERSHON.
PRODUCTION OF PREDETERMINED DISTRIBUTION OF MAGNETIC FLUX IN ELECTRIC MOTORS,
GENERATORS, AND OTHER APPARATUS.
APPLICATION FILED APR. 11, 1907.

998,026.

Patented July 18, 1911.

Witnesses
Arthur E. Mahan
A. Dunham,

Inventor
R.D.Mershon
By his Attorneys
Kerr, Page & Cooper

R. D. MERSHON.
PRODUCTION OF PREDETERMINED DISTRIBUTION OF MAGNETIC FLUX IN ELECTRIC MOTORS, GENERATORS, AND OTHER APPARATUS.
APPLICATION FILED APR. 11, 1907.

998,026.

Patented July 18, 1911.

6 SHEETS—SHEET 2.

Witnesses:
Arthur E. Mahan
A. S. Dunham

R. D. Mershon, Inventor
By his Attorneys
Kerr, Page & Cooper

R. D. MERSHON.
PRODUCTION OF PREDETERMINED DISTRIBUTION OF MAGNETIC FLUX IN ELECTRIC MOTORS, GENERATORS, AND OTHER APPARATUS.
APPLICATION FILED APR. 11, 1907.

998,026.

Patented July 18, 1911.

6 SHEETS—SHEET 3.

Witnesses
Arthur E. Mahan
A. L. Danham

Inventor
R.D. Mershon
By his Attorneys
Kerr, Page Cooper

R. D. MERSHON.
PRODUCTION OF PREDETERMINED DISTRIBUTION OF MAGNETIC FLUX IN ELECTRIC MOTORS, GENERATORS, AND OTHER APPARATUS.
APPLICATION FILED APR. 11, 1907.
998,026.
Patented July 18, 1911.
6 SHEETS—SHEET 4.
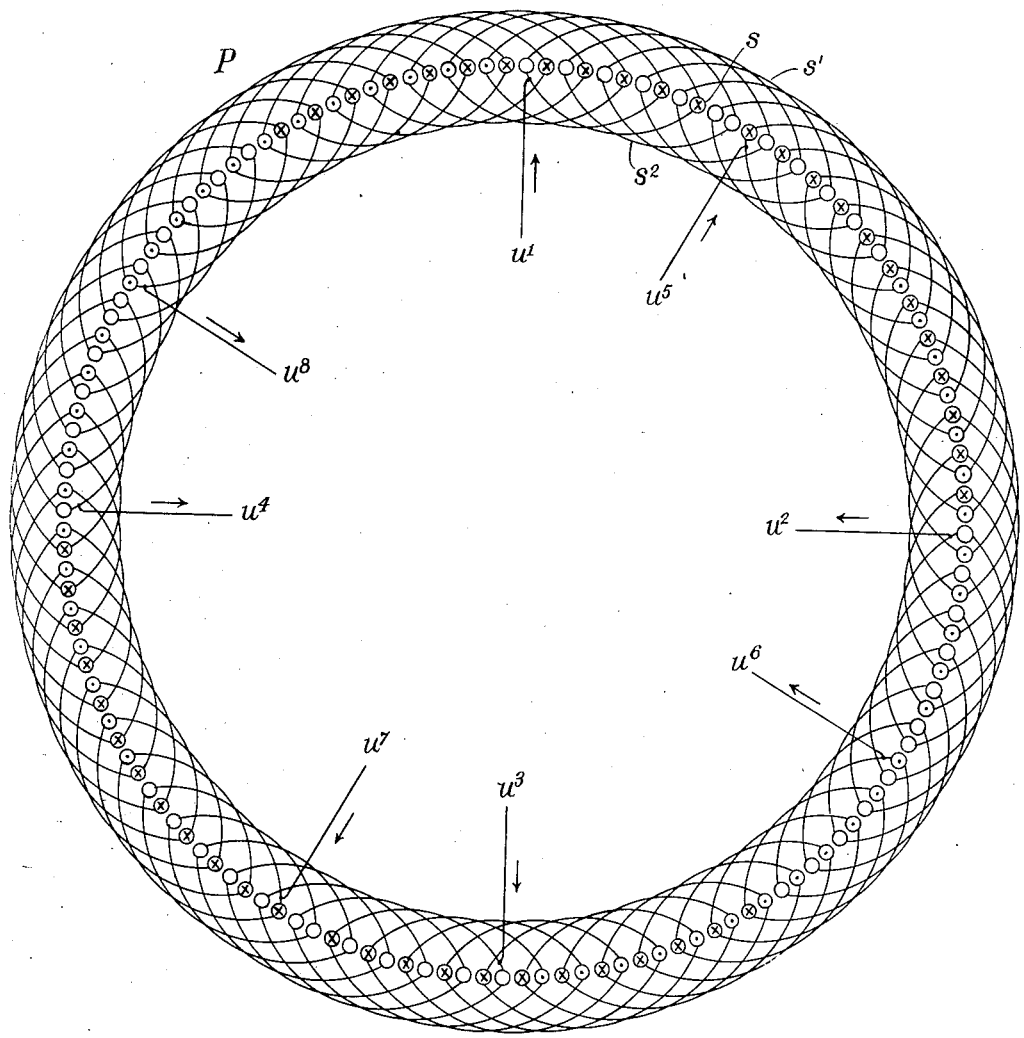
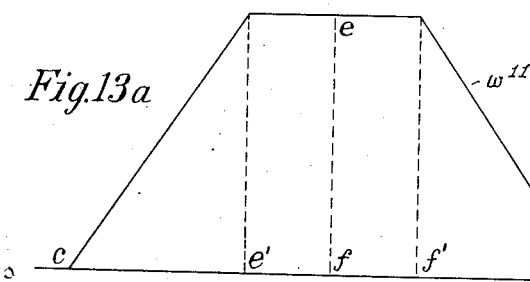

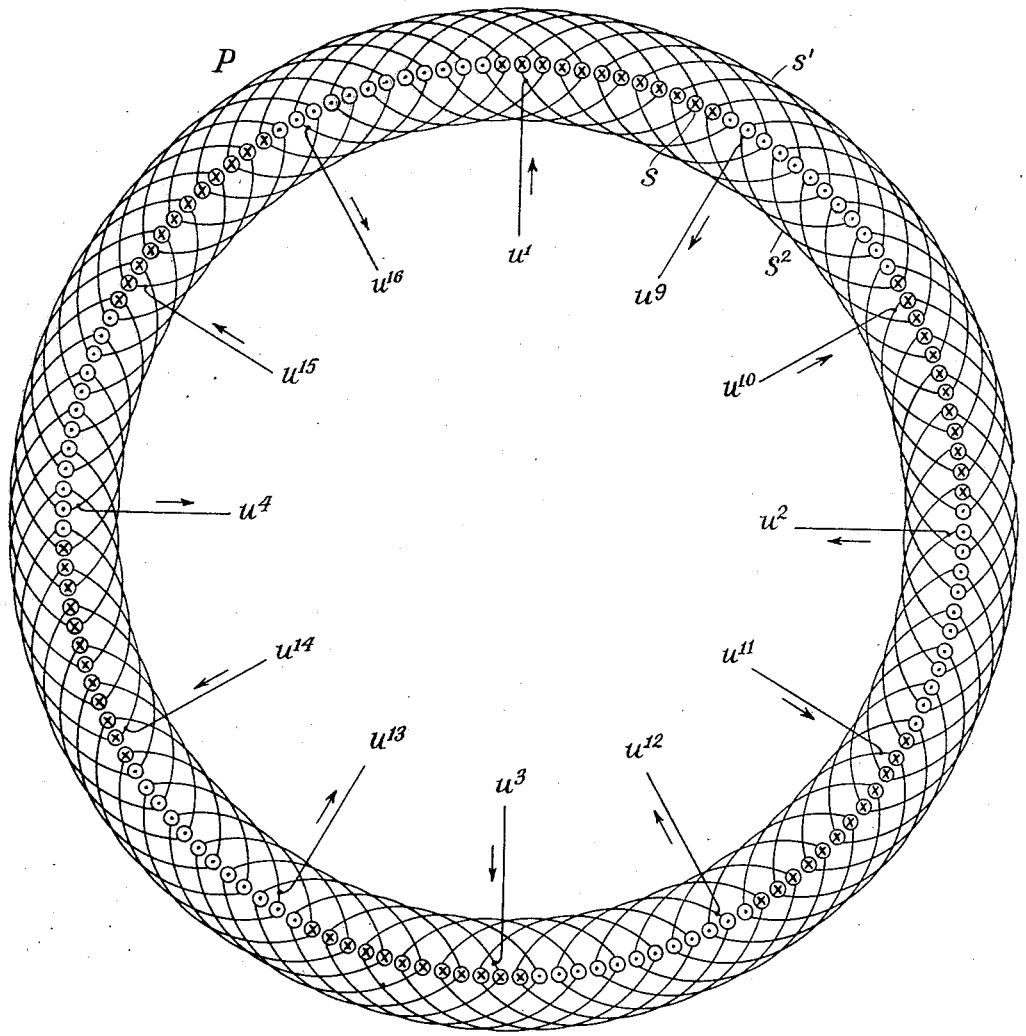
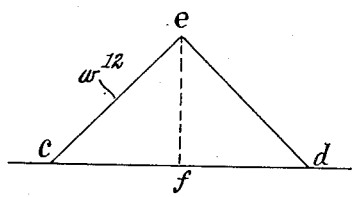

R. D. MERSHON.
PRODUCTION OF PREDETERMINED DISTRIBUTION OF MAGNETIC FLUX IN ELECTRIC MOTORS, GENERATORS, AND OTHER APPARATUS.
APPLICATION FILED APR. 11, 1907.

998,026.

Patented July 18, 1911.

6 SHEETS—SHEET 6.

Witnesses
Arthur E. Mahan
J. A. Dunham

R. D. Mershon, Inventor
By his Attorneys
Kerr, Page & Cooper

UNITED STATES PATENT OFFICE.

RALPH D. MERSHON, OF NEW YORK, N. Y.

PRODUCTION OF PREDETERMINED DISTRIBUTION OF MAGNETIC FLUX IN ELECTRIC MOTORS, GENERATORS, AND OTHER APPARATUS.

998,026.

Specification of Letters Patent.   Patented July 18, 1911.

Application filed April 11, 1907. Serial No. 367,529.

*To all whom it may concern:*

Be it known that I, RALPH D. MERSHON, a citizen of the United States, residing at New York, in the county and State of New York, have invented certain new and useful Improvements in the Production of Predetermined Distribution of Magnetic Flux in Electric Motors, Generators, and other Apparatus, of which the following is a specification, reference being had to the drawings accompanying and forming part of the same.

For the purpose, well understood by those skilled in the art of electric power transmission, of securing a more advantageous distribution of magnetic flux in certain electrical apparatus, such as motors and generators, it has been customary to distribute the winding of one or more elements unevenly, or "non-uniformly." Under ordinary conditions this method secures the results intended. But when it is desired for any purpose to vary the number of poles in the apparatus it is found that a non-uniformly distributed winding adapted for one number of poles is not adapted for another number, and it has therefore been proposed to use a commutator or controller which will rearrange the connections of the various coils of the winding simultaneously with the change in the points of connection of the leads. The result of this plan is an objectionable complication of the apparatus, in addition to the fact that for low speeds, and therefore a greater number of poles, the distribution of the winding will be less effective for uniformity of field, because the number of coils per pole is greatly reduced.

The primary object of my present invention is to obtain in the case of a uniformly distributed winding the advantages resulting from a non-uniform distribution, and that without disadvantages such as those mentioned above.

To these and other ends the invention consists in the novel method and apparatus hereinafter described, and more particularly pointed out in the claims.

The invention is described in this specification as applied to single phase induction motors with uniformly distributed windings, and with special reference to a sine wave. In one of the motors herein illustrated the winding is of the Gramme ring type, and in the other it is of the drum type. It will, however, be clear from the description and explanations hereinafter given that the invention, with suitable modifications in proportions and connections of the windings, well understood by those skilled in the art, will be equally applicable to other electrical apparatus, such as induction and synchronous motors and generators both single and polyphase, with any number of poles; with reference to any other wave than a simple sine wave; with any distribution of winding other than uniform; with a drum, Gramme ring, or any other type of winding; and polyphase transformers of the type having a single core.

In the explanation hereinafter given the invention is described with reference to two poles in the Gramme ring motor, and with four and twelve poles in the drum winding, but the number of poles, whether two or more in any case, is wholly immaterial, since the invention is applicable with any number of poles.

Figure 7:
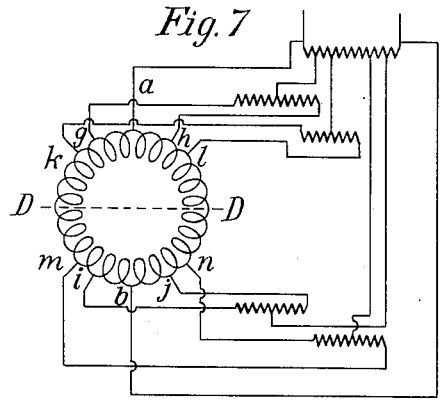
Figure 8:
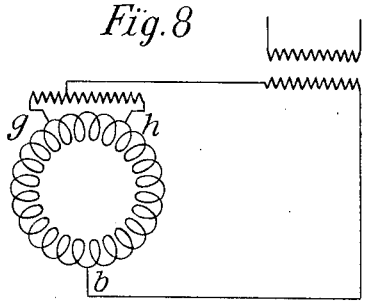
Figure 1A:
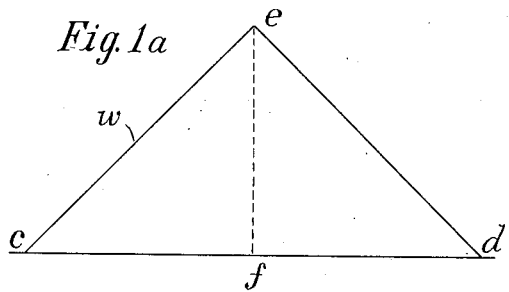
Figure 2A:
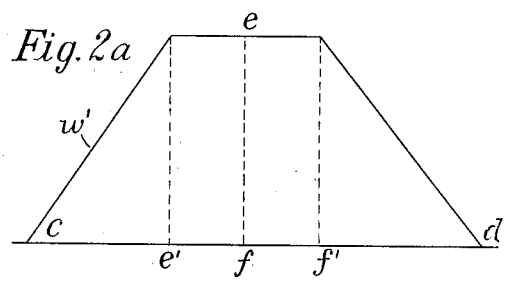
Figure 4A:
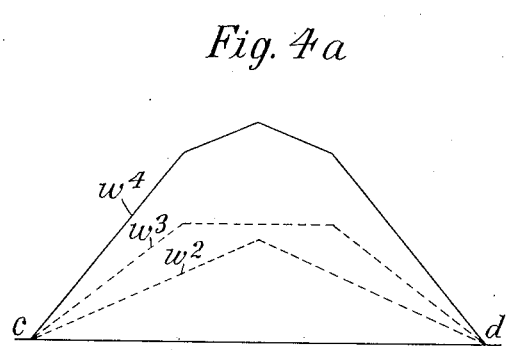
Figure 7A:
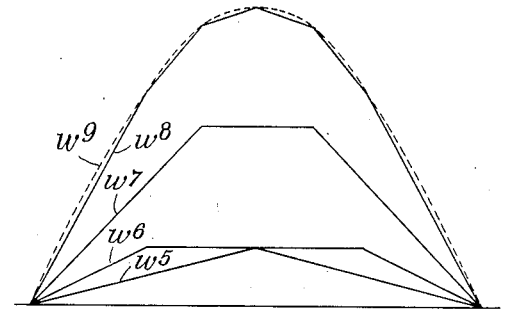
Figure 9:
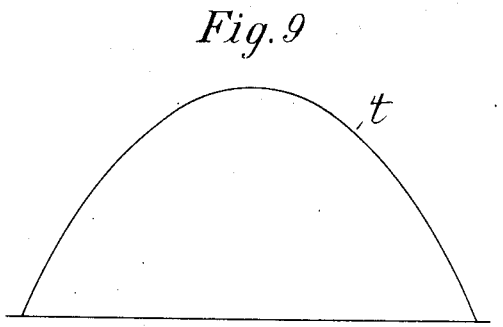
Figure 10:
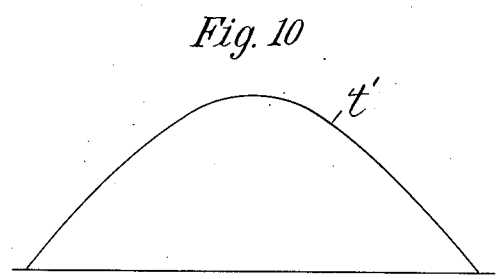
Figure 11:
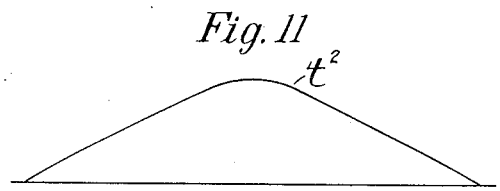
Figure 12:
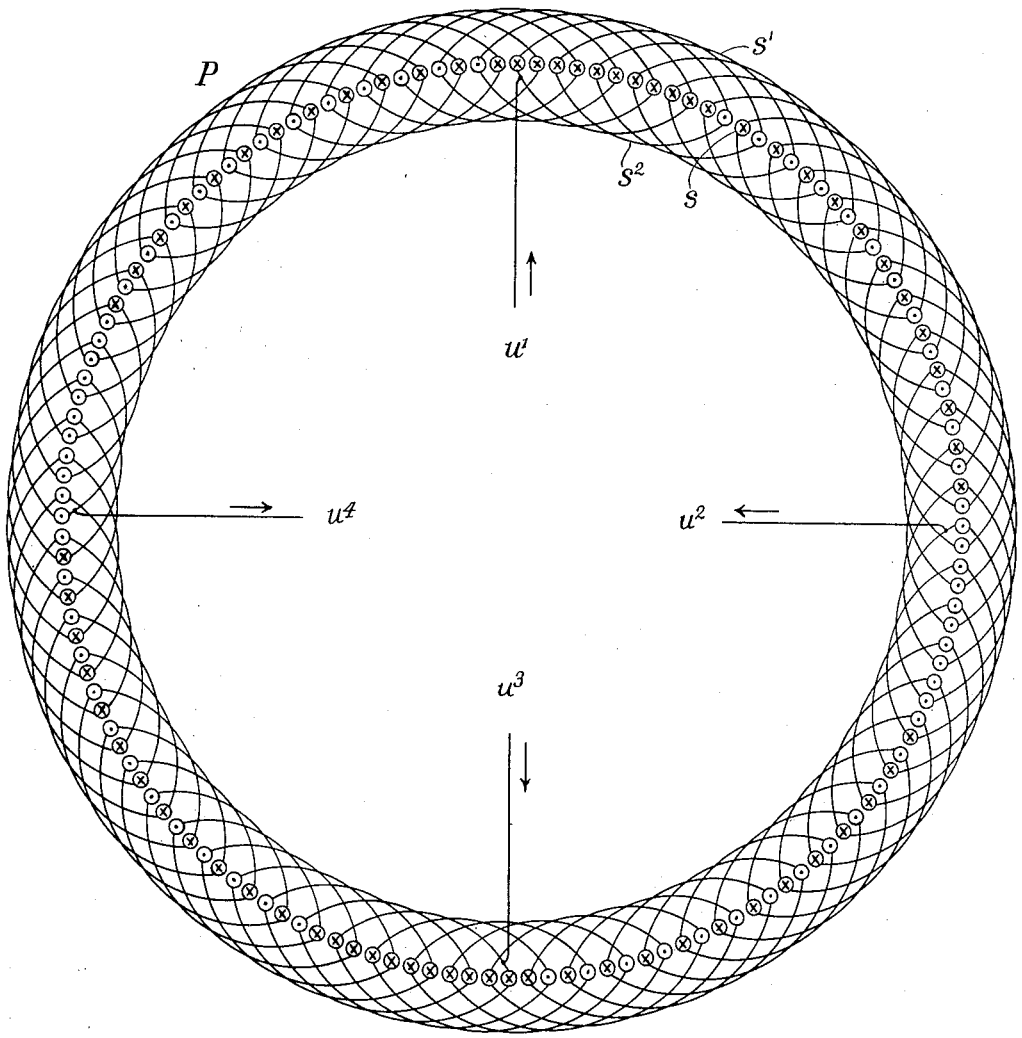
Figure 12A:
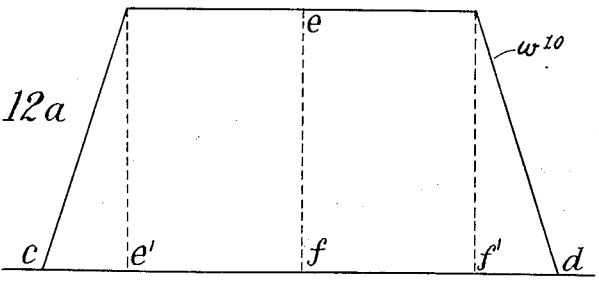
Figure 15:
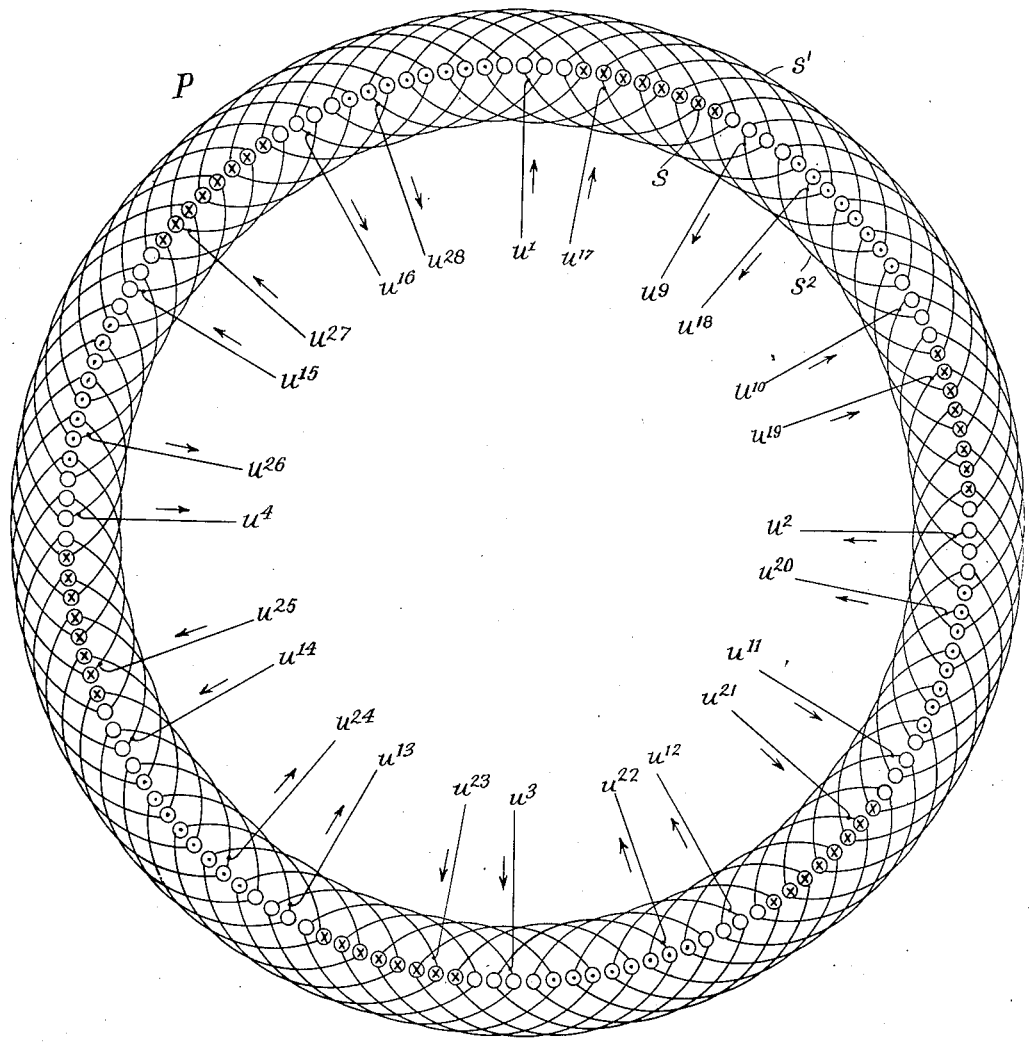
Figure 15A:
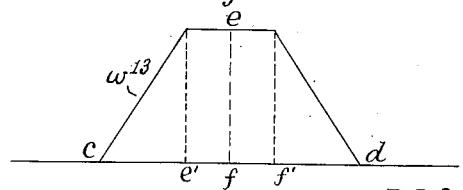

Referring now to the drawings, Figure 1 shows in diagram a Gramme ring primary element, with the current fed into its uniformly distributed winding at the ends of an electrical diameter. Fig. 1ª is the curve representing approximately the distribution of flux around 180 electrical degrees of Fig. 1, in which the degrees are platted on the horizontal axis and intensity of flux on the vertical axis. Figs. 2, 3, 4, 5, 6, 7 and 8 represent diagrammatically various modifications of the motor connections in the case of the Gramme ring motor, while Figs. 2ª, 4ª, and 7ª are flux distribution curves resulting from the conditions of Figs. 2, 4 and 7, respectively. Fig. 9 shows approximately the flux wave resulting in a circuit revolved in the field of Fig. 1, when the said circuit embraces 180 electrical degrees. Figs. 10 and 11 show such waves, when circuits which embrace 90 and 45 electrical degrees, respectively, are revolved in the field of Fig. 1. Fig. 12 is a diagrammatic end view of a drum winding, having leads or taps for four poles when connected with a source of single phase current in the ordinary manner. Fig. 12ª shows the flux distribution wave resulting from the particular winding and arrangement of taps or leads illustrated in Fig. 12. Fig. 13 shows the same winding, with the same number of poles, but with the current fed in at a plurality of points per pole in accordance with my invention, to produce a desired flux distribution wave. Fig. 13$^a$ shows the flux distribution wave resulting from the particular conditions illustrated in Fig. 13. Fig. 14 shows the same drum winding, but with twelve taps or leads, for producing twelve poles when connected with a source of single phase current. Fig. 14$^a$ shows the flux distribution wave resulting from the particular winding and arrangement of taps or leads illustrated in Fig. 14. Fig. 15 shows the same winding, with the same number of poles, produced by a plurality of taps or leads per pole in accordance with my invention. Fig. 15$^a$ shows the flux distribution wave resulting from the particular conditions shown in Fig. 15.

Throughout the drawings, P indicates the motor primary wherever such element appears.

Referring now more particularly to Fig. 1, which represents diagrammatically a simple Gramme ring winding, uniformly distributed, if the taps $a$ $b$ are connected with the terminals of a source of single phase current a magnetic field having two poles will be produced, with a certain distribution of magnetic flux or magneto-motive force. The distribution in the case of any motor may be graphically represented by a curve, the abscissæ of which, platted on the horizontal axis, represent in electrical degrees the portion of the winding in which the distribution obtains, while the ordinates represent intensity of flux or magneto-motive force. The distribution wave resulting in a motor having a uniform winding, into which the current is fed at the ends of an electrical diameter, as in Fig. 1, is illustrated by the curve $w$, in Fig. 1$^a$, in which the line $c$—$d$ represents 180 electrical degrees,—that is, the space occupied by one pole,—and the line $e$—$f$ the maximum intensity of the flux. If however, the current be fed into the winding at two points per pole, as the points, $g$, $h$, $i$, $j$, in Fig. 2, it is clear that the current will be confined to the portions of the winding between $g$ and $i$, and $h$ and $j$. Such being the case, there will be no increase in the intensity of flux between $g$ and $h$, and between $i$ and $j$, and the maximum value will be reached at the points $g$ and $h$ for the one pole and at the points $i$ and $j$ for the other. Hence, platting the distribution wave as before, the wave is found to be as shown at $w'$ in Fig. 2$^a$, in which the line $c$—$d$ again represents 180 electrical degrees, and the line $e$—$f$ the maximum intensity of flux. It will therefore be seen that by feeding the currents at separated points instead at a single point for each pole, the flux distribution wave may be modified, making the crest of the same flat instead of sharp. The length of the line $e'$ $f'$, which represents the space over which the maximum intensity of flux obtains, may be increased or decreased as desired, by moving the points $g$ and $h$ closer together or farther apart, and symmetrically, the points $i$ and $j$.

Figure 2:
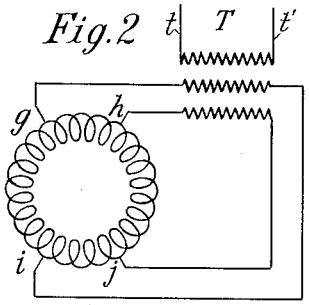
Figure 4:
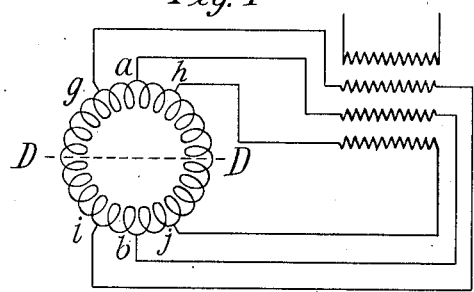

If instead of feeding the current at two points, as in Fig. 1, or at four points, as in Fig. 2, it be fed in at three points per pole, (a total of six points in the case of a two-pole motor), as in Fig. 4, still another form of wave may be obtained. In the particular example shown in Fig. 4 the taps or points of connection are designated by $g$, $a$, $h$, for one pole, and $i$, $b$, $j$ for the other, and occupy the same relative positions as similarly lettered points in Figs. 1 and 2. The current supplied at the points $a$ and $b$ will produce a flux the distribution of which is represented by a wave of the type illustrated in Fig. 1$^a$, though not necessarily of the same maximum intensity, since this factor depends upon the value of the current, or the electromotive force impressed upon the particular connection to which the flux is due, as will be more fully explained hereinafter. The wave resulting from the current fed to the points $a$ and $b$ is shown at $w^2$ in Fig. 4$^a$, in which as in Figs 1$^a$ and 2$^a$, the base line $c$—$d$ represents 180 electrical degrees, and the greatest heights of the wave the maximum intensity of flux. The wave due to the current supplied at points $g$—$h$ and $i$—$j$ will be one of the type shown in Fig. 2$^a$, and, assuming arbitrarily a maximum intensity of flux somewhat greater than that in the case of wave $w^2$, the wave shown at $w^3$ results. These two waves, $w^2$ and $w^3$, being produced in the same winding, will combine as components and form a resultant wave. This resultant wave, from the combination of components $w^2$ and $w^3$, is shown at $w^4$.

Instead of feeding the current at three points per pole, still more points may be employed, with a correspondingly resultant wave produced by the combination of the various components. For example, the winding shown in Fig. 7 is supplied with current at five points per pole, the points of connection being designated by $k$, $g$, $a$, $h$, $l$ for one pole and $m$, $i$, $b$, $j$, $n$ for the other. According to the principle explained above, and assuming, as before, arbitrary values for the maximum intensities of flux, the current supplied to points $a$ and $b$ will give the distribution wave or component indicated by $w^5$, in Fig. 7$^a$. For the points $k$, $l$ and $m$, $n$ the wave or component is that shown at $w^6$, and the component due to the points $g$, $h$ and $i$, $j$, that shown at $w^7$. These components combine, producing the resultant $w^8$, which is seen to be a very close approximation to the perfect simple sine wave shown by the dotted line $w^9$.

The maximum value of any component, which value in one or two of the examples discussed above was, for purposes of illustration, arbitrarily assumed, may be varied to any extent desired by varying the current, or, what is equivalent, the electro-motive force, impressed upon the connections to which is due the component to be modified. For example, if we desire to increase or diminish the maximum value of component $w^2$ (Fig. 4ª) we can do so by increasing or decreasing the electro-motive force impressed upon the electrical diameter, that is, on the points $a$, $b$, (Fig. 4). But if at the same time the component $w^3$ is to be kept constant, the electro-motive force which is impressed upon the winding at the points $g$, $h$, $i$, $j$, and to which the component $w^3$ is due, must be varied sufficiently to compensate for the variation in counter electromotive force caused by the variation in electro-motive force on the electrical diameter. That is, to an extent sufficient to keep the current for component $w^3$ constant.

It will now be seen that any desired distribution of flux may be produced by feeding into the winding or windings currents of the proper value or values at the proper points suitably located. Where two or more components are produced, the ultimate distribution is the resultant of the components, which latter must be of such magnitude and distribution that their resultant will be the distribution desired; it being remembered that the distribution of any component depends upon the extent and location of the portion or portions of the winding or windings traversed by the current or currents producing the component, while the magnitude of the component depends upon the value or values of such current or currents.

Figure 3:
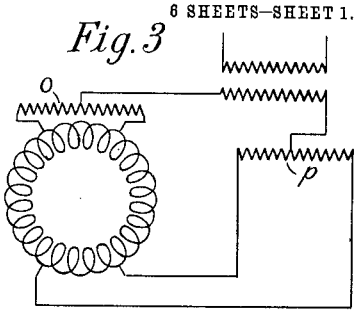

In Fig. 2, the currents fed to the points $g$—$h$, $i$—$j$ are supplied by two secondary windings on the supply transformer T, thus in effect dividing the current delivered by the terminals $t$, $t'$. Another method is to use but one transformer secondary and connect the taps therefrom to the middle points of balance coils, the ends of which are connected to the points at which currents are to be fed to the winding. This method is illustrated in Fig. 3, for example. In this figure the currents flowing to the balance coils $o$, $p$ are each divided equally and fed to the winding at two points per pole, thus giving a flat topped distribution wave, which, other conditions being the same, is identical with that resulting in Fig. 2, namely, the wave $w'$, Fig. 2ª. These balance coils may be mounted on the motor, and form a permanent part thereof, like the coil $o$, or they may be carried by the transforming apparatus, like coil $p$. Balance coils might be used in Fig. 4 if desired, in lieu of one or more of the transformer secondaries, and in Fig. 7 the balance coil method is used exclusively, and with no transformer secondary at all, showing that any number of components can be obtained with no more than a single winding on the transformer. Of course it will be understod that either method may be used, or both, as desired. It will be seen that with the use of balance coils mounted on the motor the number of leads between the latter and the transformer is reduced, which in some cases may be very advantageous.

Figure 5:
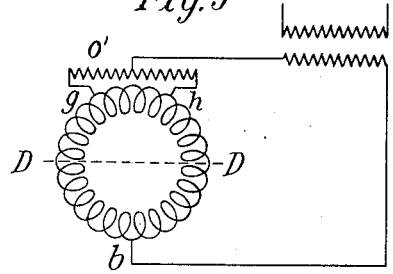
Figure 6:
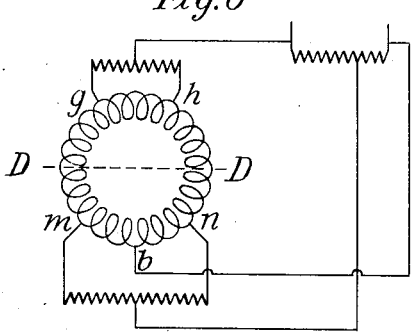

The ultimate effect of the distribution wave shown in Fig. 4ª may be obtained in some cases with but three points of connection to the motor instead of six, as in Fig. 4. The arrangement in which only three points of connection are used is illustrated in Fig. 5. Here the currents fed to points $g$ and $h$ result from division of the current supplied to the balance coil $o'$. The third point of connection is at $b$, at the opposite end of the vertical electrical diameter. Likewise, Fig. 6 shows a method of obtaining for some cases the same results as in Fig. 7, but with only five connections to the motor. However, in the case of Figs. 4 and 7 the distribution of flux above the diameter D—D, at right angles to the diameter on which the points $a$ and $b$ are located, is the same as that below the diameter D—D; whereas in Figs. 5 and 6 the distribution on one side of that diameter is different from that on the other side, and this fact must be kept in mind, when employing the method of connection exemplified in these last mentioned figures, as explained hereinafter.

In the various figures thus far described, the distribution of flux is symmetrical with respect to the vertical diameter, since the arrangement of the points of connection are symmetrical with reference to the vertical diameter, and the respective currents are equal. If for any reason an unsymmetrical distribution is desired, the same may be obtained by arranging one or more sets of connections unsymmetrically, or by increasing or decreasing the current fed to one or the other side of one or more sets of connections. The balance coil method of providing currents affords a convenient way of producing an unsymmetrical distribution, and a simple example of such method is shown in Fig. 8. In this figure the current from the transformer is supplied to the balance coil at a point other than the center, and hence the currents flowing from the ends thereof are not equal, that flowing from the left end being the greater. By shifting the point at which the lead from the transformer is connected with the coil any desired difference in the values of the current may be readily obtained.

If in the field of any of Figs. 1 to 7 inclusive an armature bearing an electric circuit be rotated, the circuit will have in it a flux wave the form of which will depend, in general, upon the size of the arc, that is, the number of electrical degrees, embraced by the circuit, being different for each size of arc so embraced. In the case of Figs. 1, 2, 4 and 7, the smaller the arc embraced by the armature (or secondary) circuit, the more nearly will the form of the flux wave therein approach the form of the flux distribution curve corresponding to the particular method employed for connecting the primary element with the source of current. For example, in the case of Fig. 1, if the secondary circuit referred to embraces 180 electrical degrees, the form of flux wave therein will be substantially that shown at $t$ in Fig. 9. If 90 or 45 electrical degrees, then those shown at $t'$ and $t^2$ in Figs. 10 and 11 respectively. Now it is clear that the electro-motive force due to any of these flux waves (Figs. 9, 10 or 11) is not exactly that which is ordinarily desirable, namely, that due to a sine flux wave, although for secondary circuits embracing a sufficiently great electrical arc it may approximate a simple sine wave quite closely, as shown, for example, in Figs. 9 and 10; and it is also clear that there will be different electro-motive forces in secondary circuits of different sizes. It is very desirable in most cases to have an electro-motive force wave closely approximating a simple sine wave, and to have the same electro-motive force wave in all secondary circuits, large or small. This latter condition is particularly desirable in the case of induction motors having "squirrel-cage" secondaries, since such a secondary is composed in effect, of a great number of small circuits. Now a simple sine electromotive force wave will be obtained in any circuit in which the flux wave is a simple sine, and if the flux distribution in the primary be made a simple sine distribution the flux in any and all secondary circuits, large or small, will follow the sine law and such circuits will have the same form of electromotive force wave, namely, a simple sine wave. In accordance with this theory, with the method of connection employed in Fig. 7, which produces a flux distribution wave (shown in Fig. 7ª) very closely approximating a simple sine wave, any secondary circuit, large or small, will have in it an electro-motive force wave which is a correspondingly close approximation to a simple sine wave. In the case of Fig. 4, in which the flux distribution wave (Fig. 4ª) less closely approaches the ideal form, the electro-motive force wave in any secondary circuit employed therewith will approach the ideal form less closely, and the divergence from the latter will increase as the size of the circuit is reduced. In the case of Figs. 5 and 6, which are modifications corresponding to Figs. 4 and 7, respectively, corresponding electro-motive force waves will be produced in their secondary circuits only when such circuits each embrace 180 electrical degrees. This is due to the fact that, as previously stated, the distribution of flux on one side of the diameter D—D in these figures is not the same as on the other side.

So far in the description of the invention it has been illustrated as applied to a Gramme ring winding, but, as already stated, it can be employed with all other types of winding as well; and in Figs. 12 to 15ª I have shown it utilized in a winding of the so-called "drum" type.

The drum winding chosen for purposes of illustration is composed of 144 conductors, $s$, spaced equi-distantly, connected in 72 pairs to form what is known as a "lap" winding, each pair constituting a coil. In the figures, each coil consists of a single "turn", but it is to be remembered that any number of turns per coil may be used as desired. Although the drum winding herein illustrated is of the "lap" type, the invention is in no way limited thereto, but may be used with any other type.

On the outside of the circle in which the conductors lie are arcs $s'$, indicating wires at the rear end of the drum connecting the conductors $s$ in pairs, each conductor being connected with the twelfth from it, counting to right or left, as the case may be. On the inside of the circle, the arcs $s^2$ indicate wires at the front end of the drum, also connecting the conductors in pairs, but in this case each conductor is connected with the tenth one, counting to right or left as before. The result is that the winding has a 30° pitch, since each coil, or connected pair of conductors, subtends an angle of 30° at the center of the circle. This pitch is used here merely as a convenient one, and it is to be understood that any other pitch may be used, as desired.

Referring to Fig. 12, $u^1$, $u^2$, $u^3$, $u^4$ indicate equally spaced taps or leads, to be connected with a single phase source, taps $u^1$ and $u^3$ being connected with one terminal of the source and taps $u^2$ and $u^4$ with the other terminal, four poles being thus produced. The taps are connected to the drum winding illustrated, at the front end of the latter. Assuming the current to be flowing, at a given instant, in the direction of the arrows on the taps, it is clear that in traversing the winding the current will flow downward, that is, from front to rear, in some of the conductors, and such conductors are indicated by $x$. In other conductors the direction of the current will be upward, that is, from rear to front, and these conductors are indicated by dots placed therein. The direction of the current in the various conductors being known, the distribution of magnetic flux, or magneto-motive force, can readily be found. When successive conductors have current of the same direction, up or down as the case may be, their magneto-motive forces add together. Such conductors may therefore be conveniently termed "active" conductors. But where successive conductors have equal currents of opposite direction it is clear that their magneto-motive forces will neutralize each other; and for this reason such conductors may be conveniently termed "neutralizing". Now taking any electrical diameter (180 electrical degrees) in Fig. 12, we find that it has twelve "active" and twenty-four "neutralizing" conductors. Keeping these numbers in mind we can readily plat the flux distribution curve of Fig. 12. Thus, in Fig. 12$^a$, the line $c$—$d$ indicates the space occupied by a single pole, that is, an electrical diameter; line $e$—$f$ indicates the maximum intensity of flux; and the points $e'$, $f'$, the points at which the maximum intensity of flux is attained. In other words, the line $e'$—$f'$ is the space of electrical arc occupied by neutralizing conductors. Hence with these values the distribution wave is that indicated by $w^{10}$. If this wave is too flat, it may be readily sharpened by means of my invention, and to do so we have merely to diminish the space occupied by neutralizing conductors and increase the space occupied by active conductors. In accordance with my invention this may be done by feeding the current into the winding at a plurality of points per pole, so arranged as to give the desired number and location of active and neutralizing conductors. Fig. 13 shows an arrangement of two taps per pole, for giving the distribution shown at $w^{11}$, Fig. 13$^a$. In this arrangement, taps $u^1$, $u^5$, $u^3$, $u^7$ are connected with one terminal of the source, by the transformer or the balance coil method described in the explanation given with reference to the application of the invention to a Gramme ring winding, and taps $u^2$, $u^6$, $u^4$, $u^8$ are similarly connected with the other terminal of the source. In Fig. 13, as in Fig. 12, the conductors in which the current is flowing downward are indicated by x's, and those in which the current is flowing upward are indicated by dots; while those in which no current is flowing are left blank. With these designations in mind it will be seen that the active conductors in Fig. 13, though only twelve in number as in Fig. 12, are distributed over a space twice as great as that occupied by neutralizing conductors. Hence the flux distribution wave is that indicated by $w^{11}$, Fig. 3$^a$, in which, as before, the line $c$—$d$ is 180 electrical degrees, $e$—$f$ the maximum intensity of flux, and $e'$—$f'$ the space occupied by neutralizing conductors.

It will be observed that in Fig. 13 some of the conductors, which in Fig. 12 were neutralizing, have no designation by dots or x's, thus indicating that they have no current flowing in them and hence are "idle". That is, not only has the flux distribution been modified but some of the neutralizing conductors have been made "idle", thus diminishing the copper or $C^2R$ loss of the winding. By using more leads per pole, as was done in some of the illustrations of the invention as applied to the Gramme ring type of winding, a still different flux distribution wave can be produced and at the same time some of the idle conductors made active, thus increasing the total number of effective coils.

In Fig. 14, twelve poles are produced, the motor being connected with the source by one lead or tap per pole, taps $u^1$, $u^{10}$, $u^{11}$, $u^3$, $u^{14}$, $u^{15}$ being connected to one terminal and taps $u^9$, $u^2$, $u^{12}$, $u^{13}$, $u^4$, $u^{16}$ to the other. Indicating the direction of current in the conductors as before, by dots and x's it will be seen that there are now no neutralizing conductors. Hence, the flux distribution wave will be sharp, as shown at $w^{12}$, Fig. 14$^a$, in which, as in the previous flux-wave figures, $c$—$d$ is 180 electrical degrees, and $e$—$f$ the maximum intensity of flux. If this wave is too sharp, it may be flattened to any desired extent by feeding the current at two or more points per pole, and in Fig. 15 is shown an arrangement of two leads or taps per pole, located so as to give a flat-topped wave, as in Fig. 15$^a$. In this arrangement of taps, those designated by $u^1$, $u^{17}$, $u^{10}$, $u^{19}$, $u^{11}$, $u^{21}$, $u^3$, $u^{23}$, $u^{14}$, $u^{25}$, $u^{15}$, $u^{27}$, are connected to one terminal of the source, by the transformer or the balance-coil method, and those designated by $u^9$, $u^{18}$, $u^2$, $u^{20}$, $u^{12}$, $u^{22}$, $u^{13}$, $u^{24}$, $u^4$, $u^{26}$, $u^{16}$, $u^{28}$, are similarly connected with the other terminal. Indicating the direction of current in the various conductors by dots and x's, as before, we find that there are now no neutralizing conductors, there being only active and idle conductors, but that the space occupied by the latter is only one-half that occupied by the former. Platting the resulting distribution wave we get that shown at $w^{13}$, Fig. 15$^a$.

If with a drum winding a flux distribution wave of the type shown at $w^4$, Fig. 4$^a$, or $w^8$, Fig. 7$^a$, is desired, it may be produced by a similar method of procedure, that is, by a combination of a sufficient number of suitable components. Of course as in the case of the Gramme ring winding, the magnitude of any component, that is, the maximum intensity of the flux, depends upon the value of the current, or, what is equivalent, the electro-motive force, impressed upon the connections to which the particular component is due.

The invention has been described with reference to obtaining a desired flux distribution. This, however, is equivalent, in the case of an induction motor, to obtaining a desired counter electro-motive force wave, or, in the case of an induction generator, a desired electro-motive force wave, with a given electro-motive force wave impressed by the circuit with which the machine is connected. It is also clear that by a similar method of procedure there may be obtained in a synchronous motor any desired counter electro-motive force wave, or in a synchronous generator, any desired electro-motive force wave, with a given form of flux distribution.

The forms of apparatus illustrated in the various figures of the drawings are of course diagrammatic, and merely illustrative of my invention, which is capable of employment in numerous other ways. The use of transformers, auto-transformers, balance coils, etc., may be varied widely within the proper scope of the invention, so that it is impracticable and unnecessary to show more than a few typical examples, as is done herein. It should be remembered also, that the results obtained when the invention is applied to a generator or other apparatus are ultimately equivalent to those obtained in the case of a motor, so that the claims appended hereto cover the invention when applied to a generator or other apparatus as well as when applied to a motor. In employing my invention in polyphase apparatus the principles involved are essentially the same as with single phase, one or more phases being treated after the method described herein for single phase.

The present application for Letters Patent is in lieu of my prior applications Ser. No. 174,698, filed Sept. 26, 1903, and Ser. No. 347,816, filed Dec. 14, 1906.

What I claim is:

1. In an electrical apparatus of the kind described, having a winding or windings, the method of producing magnetic flux having a desired distribution, which consists in feeding into the winding or windings, at a plurality of points per pole chosen with reference to the extent and location of the portion or portions of the winding or windings which they traverse, currents of the same phase and of determined value, whereby the magnitude and distribution of the flux component or components produced by the resulting magneto-motive forces will be those requisite for a resultant flux of the distribution desired, as and for the purposes set forth.

2. In electrical apparatus of the kind described, having a winding or windings, the method of producing magnetic flux having a desired distribution, which consists in feeding into the winding or windings, at three or more points per pole chosen with reference to the extent and location of the portion or portions of the winding or windings which they traverse, currents of the same phase and of determined value, whereby the magnitude and distribution of the flux component or components produced by the resulting magneto-motive forces will be those requisite for a resultant flux of the distribution desired, as and for the purposes set forth.

3. In electrical apparatus of the kind described, having a winding or windings, the method of producing magnetic flux having a distribution approximating a simple sine distribution, which consists in feeding into the winding or windings currents of determined number and value and at a plurality of points per pole chosen with reference to the extent and location of the portion or portions of the winding or windings traversed by the currents, whereby the magnitude and distribution of the flux component or components produced by the resulting magneto-motive forces will be those requisite for a resultant flux having the approximate distribution desired, as and for the purposes set forth.

4. In electrical apparatus of the kind described, having a winding or windings, the method of producing magnetic flux having a distribution approximating a simple sine distribution, which consists in feeding into the winding or windings currents of the same phase of determined number and value and at a plurality of points per pole chosen with reference to the extent and location of the portion or portions of the winding or windings traversed by the currents, whereby the magnitude and distribution of the flux component or components produced by the resulting magneto-motive forces will be those requisite for a resultant flux having the approximate distribution desired, as and for the purposes set forth.

5. In an electrical apparatus of the kind described, having a winding or windings, the method of producing magnetic flux having a desired distribution, which consists in causing the current in each main lead to the apparatus to be divided into two or more currents of the same phase, and feeding these currents into the winding or windings at a plurality of points per pole chosen with reference to the extent and location of the portion or portions of the winding or windings which the currents traverse, whereby the magnitude and distribution of the flux component or components produced by the resulting magneto-motive forces will be those requisite for a resultant flux having the distribution desired, as and for the purposes set forth.

6. In electrical apparatus of the kind described, the method of producing magnetic flux having a distribution approximating a simple sine distribution, which consists in causing the current in each main lead to the apparatus to be divided into two or more currents of the same phase, and feeding these currents into the winding or windings at a plurality of points per pole chosen with reference to the extent and location of the portion or portions of the winding or windings which the currents traverse, whereby the magnitude and distribution of the flux component or components produced by the resulting magneto-motive forces will be those requisite for a resultant flux having the approximate distribution desired, as and for the purposes set forth.

7. The combination of an alternating current transmission circuit, an electrical apparatus adapted for the production of magnetic poles, and taps or leads for connecting the said circuit and the apparatus at a plurality of points per pole per phase, said points of connection being located with respect to the arc or arcs embraced thereby to produce a desired predetermined distribution of magnetic flux, as set forth.

8. The combination of an alternating current transmission circuit, an electrical apparatus adapted for the production of magnetic poles, and means intermediate to the said circuit and apparatus for leading into or out of the latter at a plurality of points per pole, currents of the same phase, said points being located with respect to the arc or arcs embraced thereby to produce a desired predetermined distribution of magnetic flux, as set forth.

9. The combination of an alternating current transmission circuit, an electrical apparatus, and means for connecting the said circuit and apparatus at two or more points per pole in the latter per phase, said points being located with respect to the arc or arcs embraced thereby to produce a desired predetermined distribution of magnetic flux, as set forth.

10. The combination of an alternating current transmission circuit, transforming apparatus connected therewith, an electrical apparatus, and means intermediate to the transforming apparatus and the said electrical apparatus for connecting the latter at two or more points per pole per phase, said points being located with respect to the arc or arcs embraced thereby to produce a desired predetermined distribution of magnetic flux, as set forth.

11. The combination of an alternating current transmission circuit, means for dividing a phase received therefrom into a plurality of currents per pole, and a motor receiving such currents at points located with respect to the arc or arcs embraced thereby to produce a desired predetermined distribution of magnetic flux, as set forth.

12. The combination of an alternating current transmission circuit, an electrical apparatus, transforming apparatus connected with the said circuit, leads between the said electrical apparatus and the transforming apparatus, and one or more balance coils between one or more of the said leads and the said electrical apparatus for dividing the currents into a plurality of currents per lead, the points of connection of the said balance coils and the said electrical apparatus being located with respect to the arc or arcs embraced by the points to produce a desired predetermined distribution of magnetic flux, as set forth.

13. An electrical apparatus adapted for the production of poles therein, provided with taps or leads for connection with an external circuit at a plurality of points for each of one or more poles, said points being located with respect to the arc or arcs embraced thereby to produce a desired predetermined distribution of magnetic flux, as set forth.

14. An electrical apparatus adapted for the production of poles therein, provided with a plurality of taps or leads for each of one or more poles, said taps or leads being connected to the apparatus at points located with respect to the arc or arcs embraced thereby to produce a desired predetermined distribution of magnetic flux, and one or more balance coils connecting taps or leads in pairs, as set forth.

15. The combination of an alternating current transmission circuit, a motor, and taps or leads for connecting the said circuit and the motor at a plurality of points per pole per phase, said points being located with respect to the arc or arcs embraced thereby to produce a desired predetermined distribution of magnetic flux, as set forth.

16. The combination of an alternating current transmission circuit, a motor, and means intermediate to the said circuit and motor for leading into the latter, at a plurality of points per pole, currents of the same phase, said points being located with respect to the arc or arcs embraced thereby to produce a desired predetermined distribution of magnetic flux, as set forth.

17. The combination of an alternating current transmission circuit, a motor, and means for connecting the said motor and circuit at two or more points per pole in the former per phase, said points being located with respect to the arc or arcs embraced thereby to produce a desired predetermined distribution of magnetic flux, as set forth.

18. The combination of an alternating current transmission circuit, transforming apparatus connected therewith, a motor, and means for connecting the transforming apparatus and the motor at two or more points per pole in the latter per phase, said points being located with respect to the arc or arcs embraced thereby to produce a desired predetermined distribution of magnetic flux, as set forth.

19. The combination of an alternating current transmission circuit, a motor, transforming apparatus connected with the said circuit, leads between the motor and the transforming apparatus, and one or more balance coils between one or more of the said leads and the motor for dividing the current into a plurality of currents per lead, the points of connection of the said balance coils and the said electrical apparatus being located with respect to the arc or arcs embraced by the points to produce a desired predetermined distribution of magnetic flux, as set forth.

20. A motor provided with taps or leads for connection with an external circuit at a plurality of points for each of one or more poles, said points being located with respect to the arc or arcs embraced thereby to produce a desired predetermined distribution of magnetic flux, as set forth.

21. A motor provided with a plurality of taps or leads for each of one or more poles, said taps or leads being connected to the apparatus at points located with respect to the arc or arcs embraced thereby to produce a desired predetermined distribution of magnetic flux, and one or more balance coils connecting taps or leads in pairs, as set forth.

RALPH D. MERSHON.

Witnesses:
M. LAWSON DYER,
S. S. DUNHAM.